United States Patent
Siswick et al.

(10) Patent No.: US 9,969,356 B2
(45) Date of Patent: May 15, 2018

(54) MOVEMENT PATTERN DETECTION IN A VEHICLE COMMUNICATION SYSTEM

(71) Applicant: Jaguar Land Rover Limited, Coventry (GB)

(72) Inventors: Howard Siswick, Coventry (GB); Mohammed Khan, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 275 days.

(21) Appl. No.: 14/893,481

(22) PCT Filed: May 30, 2014

(86) PCT No.: PCT/EP2014/061252
§ 371 (c)(1),
(2) Date: Nov. 23, 2015

(87) PCT Pub. No.: WO2014/191551
PCT Pub. Date: Dec. 4, 2014

(65) Prior Publication Data
US 2016/0176382 A1    Jun. 23, 2016

(30) Foreign Application Priority Data
May 31, 2013    (GB) .................................. 1309745.6

(51) Int. Cl.
*B60R 25/24*    (2013.01)
*G07C 9/00*    (2006.01)
(Continued)

(52) U.S. Cl.
CPC .......... *B60R 25/245* (2013.01); *B60R 16/023* (2013.01); *B60R 25/2045* (2013.01);
(Continued)

(58) Field of Classification Search
CPC ........................... B60R 25/2045; B60R 25/24
(Continued)

(56) References Cited

U.S. PATENT DOCUMENTS 5,417,312 A    5/1995    Tsuchitani et al.
5,561,331 A *  10/1996   Suyama .............. E05B 19/0082
                                                    180/287
(Continued)

FOREIGN PATENT DOCUMENTS

CN    1394253 A    1/2003
CN    201893808 U  7/2011
(Continued)

OTHER PUBLICATIONS

Identification of vehicle tracks and association to wireless endpoints by multiple sensor modalities; Daniel Becker; Jens Einsiedler; Bernd Schäufele; Alexander Binder; Ilja Radusch; International Conference on Indoor Positioning and Indoor Navigation; Year: 2013; pp. 1-10; IEEE Conferences. (Year: 2013).*
(Continued)

*Primary Examiner* — Cuong H Nguyen
(74) *Attorney, Agent, or Firm* — Myers Bigel, P.A.

(57) ABSTRACT

A communication system comprises a base station (104) positioned in the vehicle (102) and a mobile communication unit (122). The base station (104) is configured to determine a first location and a second location of the mobile communication unit (122) relative to the vehicle (102), and to determine a baseline pattern of movement of the mobile communication unit (122) based at least in part on the first location and the second location. The base station (104) is also configured to determine whether a user-initiated interaction with the vehicle (102) occurs in connection with the baseline pattern of movement, and if no user-initiated interaction with the vehicle (102) occurs in connection with the
(Continued)

baseline pattern of movement, to classify the baseline pattern of movement as an incidental pattern of movement and apply a zone adjustment to the authorization zone (138) so as to exclude to the incidental pattern of movement.

20 Claims, 6 Drawing Sheets

(51) Int. Cl.
*B60R 25/20* (2013.01)
*H04W 4/04* (2009.01)
*H04L 29/08* (2006.01)
*H04W 4/02* (2018.01)
*B60R 16/023* (2006.01)
*G01S 5/02* (2010.01)
*H04W 12/08* (2009.01)

(52) U.S. Cl.
CPC ........ *G01S 5/0289* (2013.01); *G07C 9/00309* (2013.01); *H04L 67/12* (2013.01); *H04L 67/22* (2013.01); *H04W 4/021* (2013.01); *H04W 4/046* (2013.01); *G07C 2009/00793* (2013.01); *G07C 2209/63* (2013.01); *H04W 12/08* (2013.01)

(58) Field of Classification Search
USPC .......................................... 701/29.6; 361/170
See application file for complete search history.

(56) References Cited

U.S. PATENT DOCUMENTS

| | | | |
|---|---|---|---|
| 6,034,617 A | 3/2000 | Luebke et al. | |
| 6,236,333 B1 | 5/2001 | King | |
| 6,259,362 B1* | 7/2001 | Lin | B60Q 9/00 307/10.1 |
| 7,844,377 B2 | 11/2010 | Oota et al. | |
| 8,761,603 B1 | 6/2014 | Maleki | |
| 9,193,331 B2 | 11/2015 | Endo | |
| 9,220,078 B1 | 12/2015 | Bietz | |
| 9,764,699 B2* | 9/2017 | Siswick | H04L 67/125 |
| 9,764,713 B2* | 9/2017 | Siswick | B60R 25/24 |
| 2001/0038328 A1* | 11/2001 | King | B60K 37/06 340/5.64 |
| 2002/0109587 A1* | 8/2002 | Attring | B60R 25/1004 340/426.1 |
| 2003/0181169 A1 | 9/2003 | Mutoh | |
| 2006/0077042 A1 | 4/2006 | Hock | |
| 2006/0091997 A1 | 5/2006 | Conner et al. | |
| 2007/0024121 A1 | 2/2007 | Teshima et al. | |
| 2007/0024416 A1* | 2/2007 | Tang | B60R 25/245 340/5.61 |
| 2007/0038344 A1 | 2/2007 | Oota et al. | |
| 2007/0085658 A1* | 4/2007 | King | B60R 25/24 340/5.72 |
| 2008/0284564 A1 | 11/2008 | Leitch | |
| 2009/0146846 A1 | 6/2009 | Grossman | |
| 2009/0289759 A1 | 11/2009 | Tsuchiya et al. | |
| 2010/0052931 A1 | 3/2010 | Kolpasky et al. | |
| 2010/0075656 A1 | 3/2010 | Howarter et al. | |
| 2010/0076622 A1 | 3/2010 | Dickerhoof et al. | |
| 2010/0138079 A1 | 6/2010 | Ögren | |
| 2010/0245038 A1 | 9/2010 | Ghabra et al. | |
| 2010/0271171 A1 | 10/2010 | Sampei | |
| 2011/0156885 A1* | 6/2011 | Baek | G08C 17/02 340/12.5 |
| 2011/0183601 A1 | 7/2011 | Hannon | |
| 2011/0224870 A1 | 9/2011 | Tan | |
| 2012/0044974 A1 | 2/2012 | Mukai et al. | |
| 2012/0092129 A1 | 4/2012 | Lickfelt | |
| 2012/0129545 A1 | 5/2012 | Hodis et al. | |
| 2012/0158214 A1 | 6/2012 | Talty et al. | |
| 2012/0262340 A1 | 10/2012 | Hassan et al. | |
| 2012/0268242 A1 | 10/2012 | Tieman et al. | |
| 2013/0054095 A1 | 2/2013 | Suzuki et al. | |
| 2013/0143594 A1 | 6/2013 | Ghabra et al. | |
| 2013/0171995 A1 | 7/2013 | Fujishiro et al. | |
| 2013/0342379 A1 | 12/2013 | Bauman et al. | |
| 2015/0080021 A1 | 3/2015 | Bietz | |
| 2015/0168174 A1 | 6/2015 | Abramson | |
| 2016/0059827 A1 | 3/2016 | Uddin et al. | |
| 2016/0182548 A1 | 6/2016 | Ghabra et al. | |
| 2017/0302785 A1 | 10/2017 | Abramson et al. | |
| 2018/0070290 A1 | 3/2018 | Breaux et al. | |

FOREIGN PATENT DOCUMENTS

| | | | | |
|---|---|---|---|---|
| CN | 102582537 A | 7/2012 | | |
| CN | 102747893 A | 10/2012 | | |
| CN | 103946899 A | 7/2014 | | |
| DE | 10 2006 037 237 A1 | 2/2008 | | |
| DE | 20 2010 017 197 U1 | 10/2011 | | |
| EP | 1 143 089 A2 | 10/2001 | | |
| EP | 1143089 A2 * | 10/2001 | ............. | B60R 25/24 |
| EP | 1 447 775 A2 | 8/2004 | | |
| EP | 1 916 162 A2 | 4/2008 | | |
| GB | 2 335 002 A | 9/1999 | | |
| GB | 2335002 A * | 9/1999 | ........... | B60R 25/102 |
| GB | 2 496 755 A | 5/2013 | | |
| GB | 2496755 A | 5/2013 | | |
| JP | 2003-3710 A | 1/2003 | | |
| JP | 2003-278418 A | 10/2003 | | |
| JP | 2004-308165 A | 11/2004 | | |
| JP | 2005-009200 A | 1/2005 | | |
| JP | 2007-039922 A | 2/2007 | | |
| JP | 2007-049561 A | 2/2007 | | |
| JP | 2008-255750 A | 10/2008 | | |
| JP | 2009-038745 | 2/2009 | | |
| JP | 2010-053632 A | 3/2010 | | |
| JP | 2010-160017 A | 7/2010 | | |
| JP | 2010-173384 | 8/2010 | | |
| JP | 2010-0276594 A | 12/2010 | | |
| JP | 2011-025715 A | 2/2011 | | |
| JP | 2011-184963 A | 9/2011 | | |
| JP | 2012-060609 A | 3/2012 | | |
| JP | 2012-149474 A | 8/2012 | | |
| JP | 2013-044687 A | 3/2013 | | |
| WO | WO 02/38895 A1 | 5/2002 | | |
| WO | WO 2007/010371 A1 | 1/2007 | | |
| WO | WO-2007010371 A1 * | 1/2007 | ........... | B60R 25/102 |
| WO | WO 2007/073969 A1 | 7/2007 | | |
| WO | WO 2012/084111 A1 | 6/2012 | | |
| WO | WO-2012084111 A1 * | 6/2012 | ............. | B60R 25/00 |
| WO | WO 2013/072489 A1 | 5/2013 | | |
| WO | WO-2013072489 A1 * | 5/2013 | ......... | G07C 9/00309 |

OTHER PUBLICATIONS

Communication pursuant to Article 94(3) EPC, EP App No. 14726659.7, dated Sep. 19, 2017, 7 pp.
Notice of Reasons for Rejection and English language translation, JP Application No. 2016-516177, dated Aug. 29, 2017, 7 pp.
Notice of Reasons for Rejection, Japanese Patent Application No. 2016-516185, dated Jan. 10, 2017, 6 pages.
Notice of Reasons for Rejection, Japanese Patent Application No, 2016-516197, dated Dec. 6, 2016, 8 pages.
Notification of First Office Action, Chinese Patent Application No. 201480031199.2, dated Nov. 16, 2016, 21 pages.
Notice of Reasons for Rejection, Japanese Application No. 2016-516177, dated Jan. 4, 2017.
Notification of First Office Action, Chinese Patent Application No. 201480031134.8, dated Nov. 2, 2016, 14 pages.
Notice of Reasons for Refusal, Japanese Application No. 2016-516200, dated Jan. 4, 2017.
Notification of Reasons for Refusal, Japanese Patent Application No. 2016-516178, dated Jan. 24, 2017, 6 pages.
Combined Search and Examination Report, GB 1309743.1, dated Nov. 29, 2013, 7 pages.

(56) References Cited

OTHER PUBLICATIONS

Combined Search and Examination Report, GB 1309744.9, dated Nov. 29, 2013, 7 pages.
Combined Search and Examination Report, GB 1409778.6, dated Nov. 28, 2014, 6 pages.
Notification of Transmittal of the International Search Report and the Written Opinion of the International Searching Authority, or the Declaration, PCT/EP2014/061210, dated Sep. 2, 2014, 12 pages.
Notification of Transmittal of the International Search Report and the Written Opinion of the International Searching Authority, or the Declaration, PCT/EP2014/061401, dated Sep. 2, 2014, 14 pages.
Combined Search and Examination Report, GB 1309748.0, dated Dec. 6, 2013, 6 pages.
Combined Search and Examination Report, GB 1409725.7, dated Dec. 2, 2014, 5 pages.
Examination Report, GB 1309747.2, dated Jun. 4, 2015, 2 pages.
Examination Report, GB 1309745.6, dated Jun. 4, 2015, 2 pages.
Examination Report, GB 1309748.0, dated Oct. 9, 2015, 3 pages.
Notification of Transmittal of the International Search Report and the Written Opinion of the International Searching Authority, or the Declaration, PCT/EP2014/061208, dated Jul. 16, 2014, 12 pages.
Notification of Transmittal of the International Search Report and the Written Opinion of the International Searching Authority, or the Declaration, PCT/EP2014/061336, dated Sep. 2, 2014, 14 pages.
Notification of Transmittal of the International Search Report and the Written Opinion of the International Searching Authority, or the Declaration, PCT/EP2014/061252, dated Aug. 28, 2014, 13 pages.
Search Report, GB 1309745.6, dated Dec. 4, 2013, 5 pages.
Search Report, GB 1309747.2, dated Dec. 6, 2013, 4 pages.
Wang et al., "Bluetooth Positioning using RSSI and Triangulation Methods", *2013 IEEE 10<sup>th</sup> Consumer Communications and Networking Conference (CCNC)*, Las Vegas, NV, Jan. 11-14, 2013, pp. 837-842.

\* cited by examiner

MOVEMENT PATTERN DETECTION IN A VEHICLE COMMUNICATION SYSTEM

RELATED APPLICATIONS

This application is a 35 U.S.C. § 371 national stage application of PCT Application No. PCT/EP2014/061252, filed on May 30, 2014, which claims priority from Great Britain Patent Application No. 1309745.6, filed on May 31, 2013, the contents of which are incorporated herein by reference in their entireties. The above-referenced PCT International Application was published in the English language as International Publication No. WO 2014/191551 A1 on Dec. 4, 2014.

TECHNICAL FIELD

The present invention relates to a vehicle communication system for facilitating control over vehicle functions. The present invention relates more particularly, but not exclusively, to systems and methods for facilitating control over vehicle functions based, at least in part, on position of a mobile communication unit. Aspects of the invention relate to a system, to a method and to a vehicle.

BACKGROUND OF THE INVENTION

In today's world, many vehicles are equipped with systems for facilitating remotely controlled vehicle functions such as passive entry and passive starting (i.e., PEPS) of a host vehicle. When a vehicle is equipped with a PEPS system, a user carries a mobile communication unit which can communicate with a base station located in the vehicle. To conserve use of energy stored in its internal battery, system components may remain in a low power state until an initiating trigger (for example, manipulation of a vehicle door handle) awakens one or more other system components. For example, upon sensing that a door handle has been manipulated, the base station may emit a relatively powerful Low Frequency (LF) electromagnetic field, causing a mobile communication unit that is sufficiently close to the base station to awaken. Once the mobile communication unit is awake, it may use Radio Frequency (RF) transmissions to dispatch a response signal, which may be validated by the base station. If the base station recognizes and approves the identity of the mobile communication unit, (i.e., the base station authenticates the mobile communication unit), the base station may facilitate the performance of a predefined vehicle function, such as actuating a door lock mechanism, causing the door to become unlocked.

Because the amount of energy required by the base station to generate a LF field is significant, many such systems employ a sleep mode and awaken only upon the occurrence of a trigger event. Unfortunately, the use of an initiating trigger necessitates that the sequence of authenticating the mobile communication unit be performed within an extremely short amount of time so as to avoid delays in response from the vehicle. Fast-release motors may be employed to perform the actuation functions such as unlocking a door.

An approach of the mobile communication unit toward the vehicle may be detected so that a desire for one or more vehicle functions to be performed may be anticipated and provided in a manner that reduces a perceived delay. Unfortunately, some approaches toward the vehicle are merely incidental, resulting in the occurrence of inadvertent activation of vehicle functions, whereby stored energy is consumed and systems are unnecessarily exercised.

The present invention attempts to address or ameliorate at least some of the above problems associated with vehicle communication systems.

SUMMARY OF THE INVENTION

In one aspect, the present invention provides a communication system for facilitating control over a function of a vehicle comprising a base station positioned in the vehicle and a mobile communication unit. The base station comprises a first transmitter for transmitting a signal to the mobile communication unit and a first receiver for receiving a signal from the mobile communication unit. The base station is configured to determine a first location of the mobile communication unit relative to the vehicle at a first time, to determine a second location of the mobile communication unit relative to the vehicle at a second time, and to determine a baseline pattern of movement of the mobile communication unit based at least in part on the first location and the second location. The base station is further configured to determine whether a user-initiated interaction with the vehicle occurs in connection with the baseline pattern of movement and, if no user-initiated interaction with the vehicle occurs in connection with the baseline pattern of movement, then to classify the baseline pattern of movement as an incidental pattern of movement and apply a zone adjustment to the authorization zone so as to exclude to the incidental pattern of movement.

The base station may be configured to determine at least one of the first location and the second location of the mobile communication unit relative to the vehicle based on a time of flight method. The base station may be configured to recognize when a subsequent incidental pattern of movement is substantially similar to a previously observed incidental pattern of movement and to determine a number of occurrences wherein a subsequent incidental pattern of movement is observed to be substantially similar to a previously observed incidental pattern of movement. The base station may be configured to apply a zone adjustment to the authorization zone so as to exclude to the incidental pattern of movement only when the number of occurrences exceeds a predefined threshold number of occurrences.

In another aspect, the base station may be configured to determine a rate at which subsequent incidental patterns of movement are observed to be substantially similar to a previously observed incidental pattern of movement and to apply a zone adjustment to the authorization zone so as to exclude to the incidental pattern of movement only when the rate at which subsequent incidental patterns of movement are observed exceeds a predefined threshold rate.

In one embodiment, the base station may be configured to determine a location of the vehicle and save the location together with the zone adjustment in a memory, to subsequently determine a later-determined location of the vehicle, to retrieve a zone adjustment from the memory associated with the later-determined location of the vehicle, and to apply the zone adjustment to the authorization zone.

The base station may be configured to apply a zone adjustment to the authorisation zone by adjusting a parameter associated with the authorisation zone such that authorisation of the mobile communication unit is inhibited when movement of the mobile communication unit is determined to be an incidental pattern of movement. The base station may be configured to apply a zone adjustment to an authorization zone by adjusting the dimensions of the authorisation zone. Adjusting the dimensions of the authorisation zone may comprise adjusting at least one of: a radius of the authorisation zone; the shape of an outer boundary of the authorisation zone; a size of the authorisation zone.

In another aspect, a method for facilitating control over a function of a vehicle comprises providing a base station positioned in the vehicle and a mobile communication unit, the base station comprising a first transmitter for transmitting a signal to the mobile communication unit and a first receiver for receiving a signal from the mobile communication unit. The method includes determining a first location of the mobile communication unit relative to the vehicle at a first time, determining a second location of the mobile communication unit relative to the vehicle at a second time, and determining a baseline pattern of movement of the mobile communication unit based at least in part on the first location and the second location. The method further includes determining whether a user-initiated interaction with the vehicle occurs in connection with the baseline pattern of movement and, if no user-initiated interaction with the vehicle occurs in connection with the baseline pattern of movement, classifying the baseline pattern of movement as an incidental pattern of movement and applying a zone adjustment to an authorization zone so as to exclude the incidental pattern of movement. The step of determining a first position of the mobile communication unit relative to the vehicle at a first time may be performed according to a time of flight method.

In one embodiment, a method further comprises recognizing when a subsequent incidental pattern of movement is substantially similar to a previously observed incidental pattern of movement. In yet another embodiment, a method further comprises determining a number of occurrences wherein a subsequent incidental pattern of movement is observed to be substantially similar to a previously observed incidental pattern of movement. The step of applying a zone adjustment to the authorization zone so as to exclude to the incidental pattern of movement may optionally be performed when the number of occurrences exceeds a predefined threshold number of occurrences.

In an embodiment, a method further comprises determining a rate at which subsequent incidental patterns of movement are observed to be substantially similar to a previously observed incidental pattern of movement. The step of applying a zone adjustment to the authorization zone so as to exclude to the incidental pattern of movement may be performed when the rate at which subsequent incidental patterns of movement are observed exceeds a predefined threshold rate.

In another embodiment, a method further comprises determining a location of the vehicle and saving the location together with the zone adjustment in a memory. The method may further comprise subsequently determining a later-determined location of the vehicle, retrieving the adjustment from the memory associated with the later-determined location of the vehicle, and applying the adjustment to the authorization zone. The base station may be configured for determining a location of the mobile communication unit relative to the vehicle based on a time of flight of an ultra-wide band communications between the mobile communication unit and at least one transceiver positioned in the vehicle.

The method may comprise applying a zone adjustment to an authorization zone comprising adjusting the dimensions of the authorisation zone. Adjusting the dimensions of the authorisation zone may comprise adjusting at least one of: a radius of the authorisation zone; the shape of an outer boundary of the authorisation zone; a size of the authorisation zone.

According to another aspect of the present invention, there is provided a vehicle having a communication system, or being adapted to perform a method as described in the preceding aspects.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless such features are incompatible.

BRIEF DESCRIPTION OF THE DRAWINGS

One or more embodiments of the present invention will now be described, by way of example only, with reference to the accompanying figures, in which.

DETAILED DESCRIPTION

Figure 1:
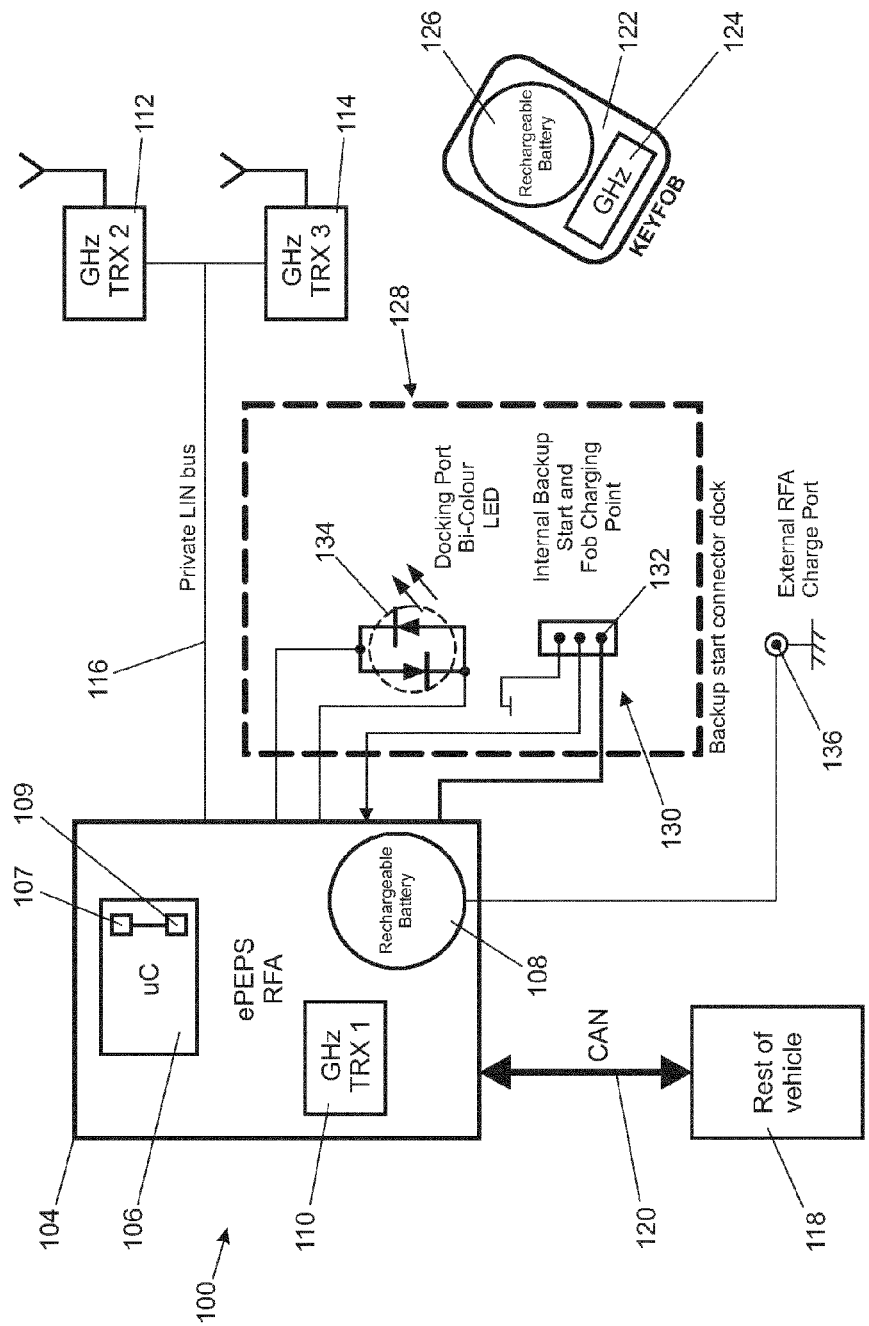
FIG. 1 shows a schematic representation of a vehicle communication system according to an embodiment of the present invention.

FIG. 1 shows a vehicle communication system 100 in accordance with an embodiment of the present invention. The vehicle communication system 100 is configured to facilitate transfer of information among components of the vehicle communication system 100, which may further facilitate control over one or more functions of a vehicle 102. Exemplary functions that may be controlled include, but are not limited to, enhanced Passive Entry and Passive Start (ePEPS) keyless access, remote engine start, remote opening and closing of vehicle apertures, deployment and retraction of external mirrors or antennas, and/or activation and deactivation of lighting and signalling systems of the vehicle 102.

The vehicle communication system 100 will be described with reference to the vehicle 102 which has a front right door 142, a rear right door 144, a front left door 146 and a rear left door 148. The vehicle 102 also has a boot lid 150 (also known as a deck lid) which can be locked/unlocked by the vehicle communication system 100 but this is not described herein for the sake of brevity. The doors 142-148 each have a lock mechanism and an external handle; and the front doors 142, 146 each have a folding door mirror. The lock mechanisms each comprise a door lock switch to provide a locking signal to indicate the status of the respective lock mechanism.

The vehicle communication system 100 comprises a base station 104 to be installed in the vehicle 102 to provide a Remote Function Actuator (RFA) for the vehicle 102. The base station 104 comprises an electronic control unit 106 and a first rechargeable battery 108. The electronic control unit 106 comprises a memory storage device 107 that is in communication with one or more processor(s) 109. The processor(s) 109 can be configured to perform computational instructions stored in the memory storage device 107. The first rechargeable battery 108 provides a dedicated power supply for the base station 104 to enable its operation independently from a vehicle power system (not shown).

The base station 104 further comprises first, second and third ultra-wideband transceivers 110, 112, 114. The first transceiver 110 is provided proximal the electronic control unit 106. The second and third transceivers 112, 114 are positioned in the vehicle 102 remote from the electronic control unit 106 and connected via a dedicated local interconnect network (LIN) 116. The transceivers 110, 112, 114 each have an integrated antenna. As discussed more fully below, the vehicle communication system 100 may further comprise a fourth transceiver (not shown) which is also positioned in the vehicle 102 remote from the electronic control unit 106 and connected via the dedicated local interconnect network (LIN) 116.

The base station 104 is connected to the vehicle systems (denoted generally by the reference numeral 118) via a CAN bus 120. The base station 104 can thereby receive signals from the vehicle systems (e.g., locking signals from door lock switches); and can control operation of one or more vehicle systems (e.g., door lock mechanisms, closure systems for vehicle apertures such as windows, sun roof, ventilation systems, deck lid, engine start/ignition, vehicle lighting, entertainment systems, horn, heater, air conditioning, and the like). The CAN bus 120 can also be employed to convey instructions from the electronic control unit 106 to other systems (e.g., actuators, controls) of the vehicle 102, such as the engine control unit, to facilitate enabling and/or disabling of one or more vehicle systems (e.g., passive engine starting).

The vehicle communication system 100 further comprises a mobile communication unit 122 having a remote ultra-wideband transceiver 124 and a second rechargeable battery 126. The mobile communication unit 122 is portable to facilitate its being carried by the user. As described herein, the mobile communication unit 122 communicates with the base station 104 to facilitate control over vehicle functions, such as passive entry to the vehicle 102, and, under some circumstances, to provide information to a user in possession of the mobile communication unit 122.

The base station 104 further comprises a dock 128 for receiving the mobile communication unit 122. The dock 128 has a port 130 to enable communication between the base station 104 and the mobile communication unit 122. A charging pad 132 is also provided in the dock 128 to facilitate charging of the second rechargeable battery 126 when the mobile communication unit 122 is docked and thus mated with the charging pad 132. A bi-colour light emitting diode 134 is provided in the dock 128 to indicate the status of the mobile communication unit 122 (for example to indicate that the second rechargeable battery 126 is charging or is fully charged). The charging pad 132 is connected to a power supply unit (PSU) provided in the base station 104. An external charge port 136 for the base station 104 is provided for charging the first rechargeable battery 108.

Figure 2:
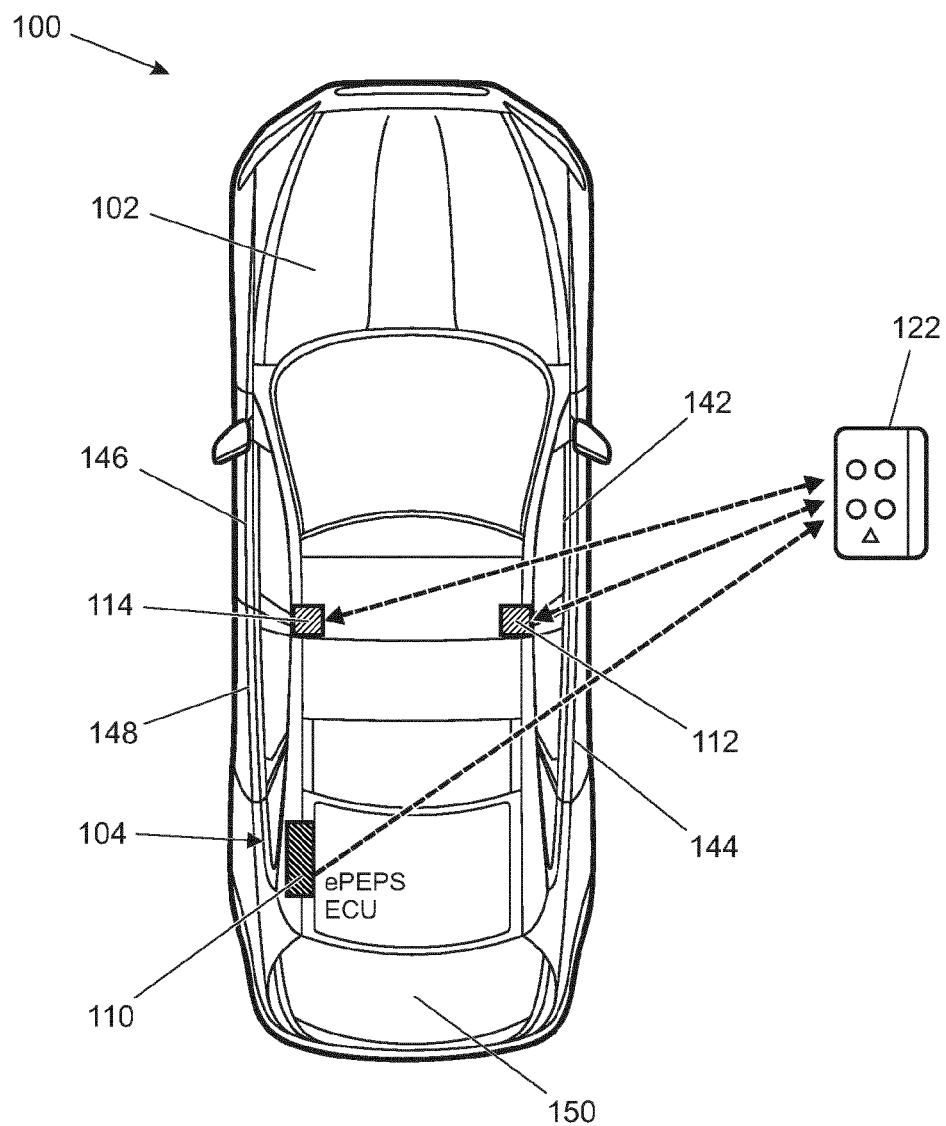
FIG. 2 shows the installation of the base station and transceivers of the vehicle communication system according to one embodiment of the present invention in a motor vehicle.

The installation of the vehicle communication system 100 is illustrated in FIG. 2. The base station 104 and the first transceiver 110 are located at the rear of the vehicle 102 and the second and third transceivers 112, 114 are located in the upper part of the vehicle 102 (typically in the roof) on the right and left sides respectively of the vehicle 102. As illustrated by dashed lines in FIG. 2, the transceivers 110, 112, 114 communicate with the mobile communication unit 122. The distance from each of the first, second and third transceivers 110, 112, 114 to the remote transceiver 124 can be determined by measuring transmission and/or response time (for example, time of flight for a signal transmission) thereby allowing the position of the mobile communication unit 122 in relation to the vehicle 102 to be determined through triangulation. The use of ultra-wideband frequencies (typically greater than 3 GHz) allows the position of the mobile communication unit 122 to be tracked with a relatively high degree of accuracy.

In accordance with such an embodiment of the vehicle communication system 100, wherein the base station 104 comprises three transceivers 110, 112, 114 disposed at spaced apart locations within the vehicle 102, it is possible to use the transmission and/or response times for communications sent between the mobile communication unit 122 and each of the transceivers 110, 112, 114 to determine a position of the mobile communication unit 122 relative to the vehicle 102 along each of two axes. For example, with the base station 104 and the first transceiver 110 located toward the rear of the vehicle 102 and the second and third transceivers 112, 114 disposed within the roof (on respective left and right sides), the position of the mobile communication unit 122 relative to the vehicle 102 can readily be determined, i.e. as shown in the plan view of FIGS. 2 to 6.

However, with the second and third transceivers 112, 114 disposed in the vehicle roof, and therefore lying in the same horizontal plane, there may be situations in which it is not possible to readily determine the position of the mobile communication unit 122 along a direction normal to the plan views of FIGS. 2 to 6. Accordingly, in a further embodiment of the invention, the vehicle communication system 100 may comprise a fourth transceiver (not shown) which is disposed within the vehicle 102 at a location which is spaced apart in a vertical direction from both the plane of the vehicle roof and the horizontal plane in which the base station 104 lies. For example, the fourth transceiver (not shown) could be mounted in the vehicle dashboard on the vehicle center line. With this configuration, the height of the mobile communication unit 122 relative to the vehicle 102 can readily be determined.

Thus, a position of the mobile communication unit 122 relative to the vehicle 102 may be periodically or continuously determined and may be saved in the memory storage device 107 for subsequent retrieval and analyses by the processor 109. Such monitoring and storing and processing of position information may be useful for observing, tracking, and identifying certain rates, patterns, and/or characteristics of movement. For example, the vehicle communication system 100 may be configured to detect an approach of the mobile communication unit 122 toward an authorization zone 138 defined relatively to the vehicle 102, to detect a departure of the mobile communication unit 122 from the authorization zone 138, to detect a continuing presence of the mobile communication unit 122 within the authorization zone 138, and to recognize patterns involving combinations of approaches, departures, and prolonged presences relative to the authorization zone 138 of the vehicle 102.

The remote transceiver 124 of the mobile communication unit 122 transmits a polling signal which, when received by the first transceiver 110 of the base station 104, initiates communication between the base station 104 and the mobile communication unit 122. In one embodiment, upon receipt of the polling signal, the first transceiver 110 responds by transmitting a challenge signal. The challenge signal is received by the mobile communication unit 122 and prompts the mobile communication unit 122 to transmit a response signal. The electronic control unit 106 receives the response signal and attempts to determine whether it was sent by an authorized device (i.e., to validate or authenticate the mobile communication unit 122).

If the response signal is authenticated, the electronic control unit 106 continues to communicate with the mobile communication unit 122 and tracks its position in relation to the vehicle 102 and may store the position information in the memory storage device 107 for retrieval and processing by the processor 109 in accordance with pre-defined instructions. Moreover, provided the challenge/response sequence is completed successfully, the electronic control unit 106 will provide control over functions of the vehicle 102 subject to satisfaction of operating criteria. If the response signal is not authenticated, the electronic control unit 106 will not facilitate user control over vehicle functions, such as unlocking the doors of vehicle 102 or starting the engine of vehicle 102.

In one mode of operation, the polling signal is transmitted continually by the remote transceiver 124 so that communication with the base station 104 is initiated by the mobile communication unit 122. Accordingly, the vehicle communication system 100 can initiate a challenge/response cycle without the need for user interaction, such as actuating a door handle.

In another mode of operation, such as may be active upon first entry of the vehicle 102 into service, to conserve energy stored in the second rechargeable battery 126, the polling signal is transmitted for an operating period of thirty (30) days. The transmission of the polling signal is stopped if the mobile communication unit 122 does not establish communication with the base station 104 during the operating period. A button provided on the mobile communication unit 122 can be pressed to re-commence transmission of the polling signal after said operating period has expired.

In another embodiment, the polling signal is transmitted intermittently, rather than continuously. In accordance with this embodiment, the polling signal is repeated during the operating period with a time interval between transmission cycles (pulses), i.e. the polling signal is transmitted periodically during the operating period. The time interval between the transmission cycles can be modified in response to measured parameters. For example, the time interval between transmissions can be modified depending on the measured distance between the vehicle 102 and the mobile communication unit 122. For example, if the mobile communication unit 122 is close to the vehicle 102, the time interval can be reduced to one (1) second. Conversely, if the mobile communication unit 122 is relatively far away from the vehicle 102, the time interval can be increased to five (5) seconds.

The base station 104 and the mobile communication unit 122 can communicate with each other over a range of at least 20 meters. The authorization zone 138 is defined within the communication range. For example, the authorization zone 138 may be defined as having a radius of 2 meters around the vehicle 102. When the electronic control unit 106 determines that the mobile communication unit 122 is inside the authorization zone 138, the base station 104 may facilitate automatic unlocking of one or more of the vehicle's doors 142-148. Conversely, when the electronic control unit 106 determines that the mobile communication unit 122 is outside the authorization zone 138, the base station 104 may cause the automatic locking of the vehicle's doors 142-148.

As discussed above, a vehicle communication system 100 comprising three or fewer transceivers may be able to determine a position of the mobile communication unit 122 relative to the vehicle 102 along only two axes. Accordingly, the authorization zone 138 may be defined in terms of only those two axes. A vehicle communication system 100 comprising four or more transceivers, however, may be able to determine a position of the mobile communication unit 122 relative to the vehicle 102 along any combination of three (optionally orthogonal) axes. Accordingly, the location of the authorization zone 138 may be defined in terms positions along each of the three axes, such that the authorization zone 138 (and thus the set of locations that are outside the authorization zone 138) may be defined in terms of three-dimensional space relative to the vehicle 102.

Being able to accurately determine the position of the mobile communication unit 122 in a three-dimension space around the vehicle 102 may be particularly useful in certain situations, for example when the vehicle 102 is parked in a multi-level or multi-story car park or adjacent to a multi-story building. In such situations it is possible that the driver, having exited the vehicle 102 may move to another level of the car park or building above or below the vehicle 102, but may still be sufficiently close to the vehicle 102 to be within the authorization zone 138, resulting in one or more of the vehicle doors being unlocked.

Accordingly, if it is determined that the mobile communication unit 122 is disposed sufficiently above or below the vehicle 102, such as in the example of the multi-level car park, the electronic control unit 106 may not unlock the vehicle doors even when the mobile communication unit 122 would otherwise be judged to be within the authorization zone 138.

The electronic control unit 106 may be configured to operate the vehicle communication system 100 according to a number of operating modes. In a number of scenarios, the mobile communication unit 122 is carried on the person of the user and therefore follows the movements of the user. In the accompanying figures, movement paths of the user, and therefore, the mobile communication unit 122, are illustrated by a set of footprints 140. The process performed by the base station 104 for authenticating the mobile communication unit 122 is the same as described above and is common to each of the operating modes.

In particular, the remote transceiver 124 transmits a polling signal which initiates an authentication cycle with the first transceiver 110. The base station 104 transmits a challenge signal which triggers transmission of a response signal from the mobile communication unit 122. The electronic control unit 106 validates the response signal and, if successful, the base station 104 tracks the range and position of the authenticated mobile communication unit 122. If the authentication cycle is not successfully completed, for example due to an incorrect response signal being sent from the mobile communication unit 122, the doors 142-148 will not be unlocked, and the vehicle 102 will not respond to the mobile communication unit 122.

Figure 3:
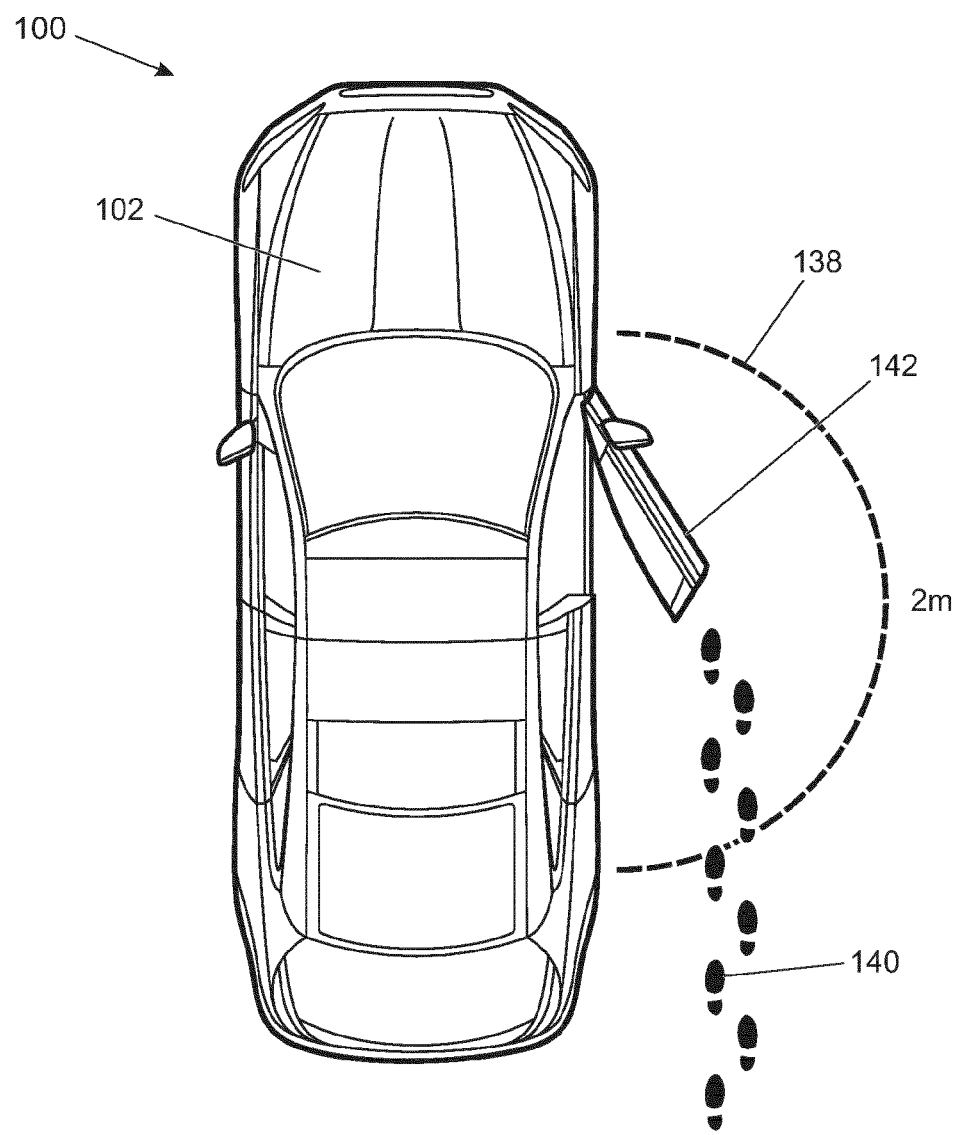
FIG. 3 shows an operating mode of the vehicle communication system according to one embodiment of the present invention.

The electronic control unit 106 may be configured to operate the vehicle communication system 100 according to a first operating mode as illustrated in FIG. 3. In this operating mode, the vehicle communication system 100 operates to unlock the doors 142-148 on the side of the vehicle 102 on which the user approaches with the mobile communication unit 122. Having authenticated the mobile communication unit 122, the base station 104 tracks its range and position. In the illustrated example, the electronic control unit 106 determines that the mobile communication unit 122 is on the right hand side of the vehicle 102. Once the base station 104 determines that the mobile communication unit 122 is within the authorization zone 138, the electronic control unit 106 automatically generates a door unlock signal to unlock both doors 142, 144 on the right hand side of the vehicle 102. The door unlock signal is transmitted via the CAN bus 120, and the front right door 142 and the rear right door 144 are both unlocked when the mobile communication unit 122 enters the authorization zone 138. As the doors 142, 144 are unlocked before the user operates the respective door handle, in normal operating conditions it is envisaged that there would be no perceptible delay when the user operates the door handle.

In this mode, when the user operates the door handle on either the front right door 142 or the rear right door 144, either a single-point entry (SPE) or a multiple-point entry (MPE) can be initiated. In single-point entry mode, when the drivers door is the only opened door and the key fob is taken into the vehicle, the rear door on the approached side will be re-locked. For the avoidance of doubt, the drivers door does not have to be closed to effect the locking of the rear door. If ANY door other than driver's door is opened, then all doors will be unlocked and remain so. The action of locking the rear door on the driver's side is caused by the key fob being detected inside the vehicle and thus no longer seen in the authorisation zone on the outside of the vehicle. In a multiple-point entry, the electronic control unit 106 generates control signals to unlock all of the other doors in the vehicle 102 when the door handle of either the front right door 142 or the rear right door 144 is operated. It will be appreciated that the front left door 146 and the rear left door 148 will be unlocked if base station 104 determines that the mobile communication unit 122 enters the authorization zone 138 on the left hand side of the vehicle 102. Only when the door handle of one of the unlocked doors 142-148 is operated is an indication provided that the doors have been unlocked, for example by flashing the side repeaters and/or extending the door mirrors. If none of the door handles are operated, however, no indication is provided that one or more of the doors 142-148 have been unlocked.

Figure 4:
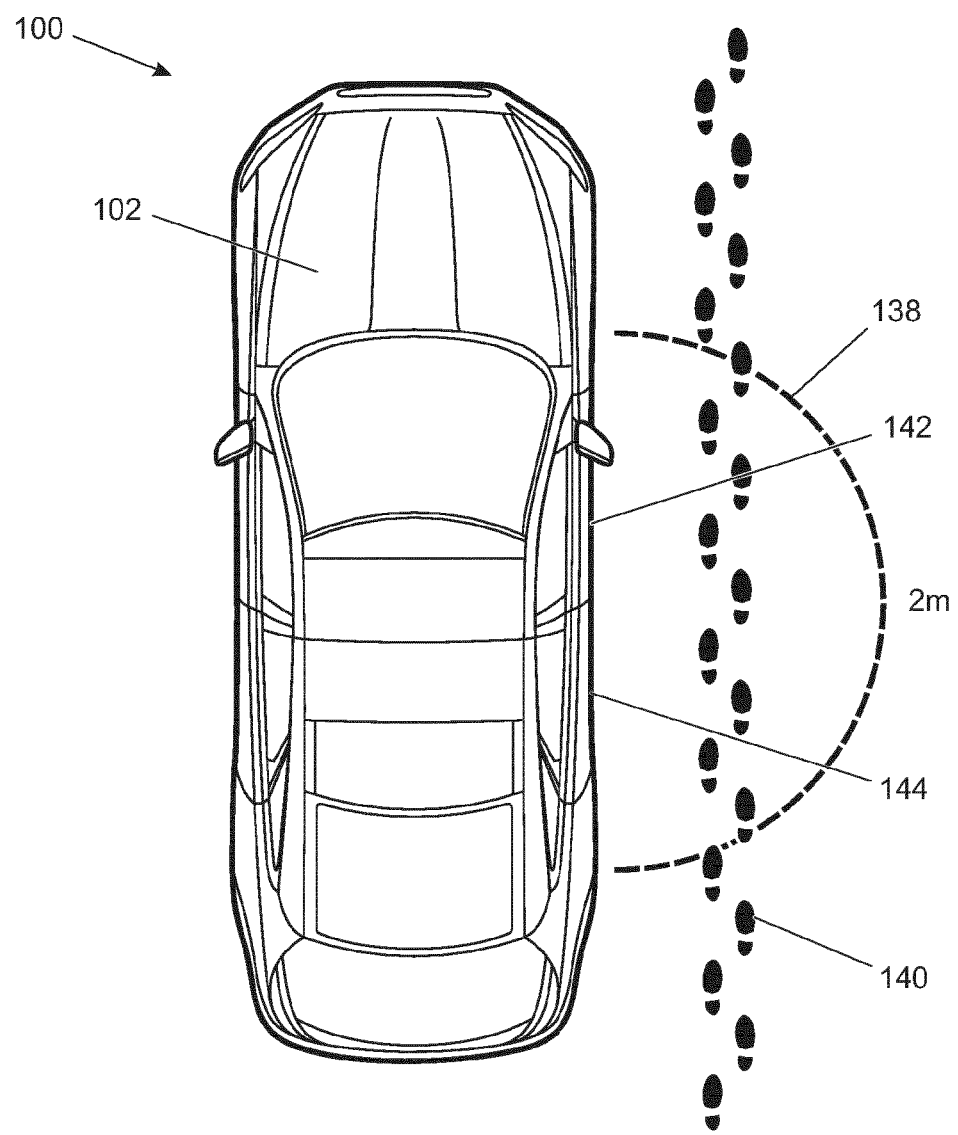
FIG. 4 illustrates another operating mode of the vehicle communication system according to one embodiment of the present invention.

The electronic control unit 106 may be configured to operate the vehicle communication system 100 according to a second operating mode as illustrated in FIG. 4 to accommodate a walk-past scenario. In this walk-past scenario, the user enters and exits the authorization zone 138 but does not operate a door handle. As in the first mode described above, the base station 104 authenticates the mobile communication unit 122 as it approaches the vehicle 102. In this case, the base station 104 tracks the position of the mobile communication unit 122 and determines that the user is approaching from the rear of the vehicle 102 on the right hand side. As described above in regard to the first mode of operation, when the vehicle communication system 100 detects that the mobile communication unit 122 has entered the authorization zone 138, as it has in this walk-past scenario, a door unlock signal is transmitted to unlock the front right door 142 and the rear right door 144.

In this scenario, however, the user does not operate the door handle on either of the doors 142, 144 and, instead, walks past the vehicle 102. Since the vehicle communication system 100 is tracking the position of the mobile communication unit 122, the vehicle communication system 100 is able to determine when the mobile communication unit 122 leaves the authorization zone 138. Accordingly, upon the departure of the mobile communication unit 122 from the authorization zone 138, and lacking the receipt of any indication that a door handle has been operated, the base station 104 transmits a door lock signal to lock the front right door 142 and the rear right hand door 144 or otherwise facilitates the re-locking of those doors. In one embodiment, the vehicle 102 does not provide a visual indication when the doors 142, 144 are unlocked or subsequently locked.

Figure 5:
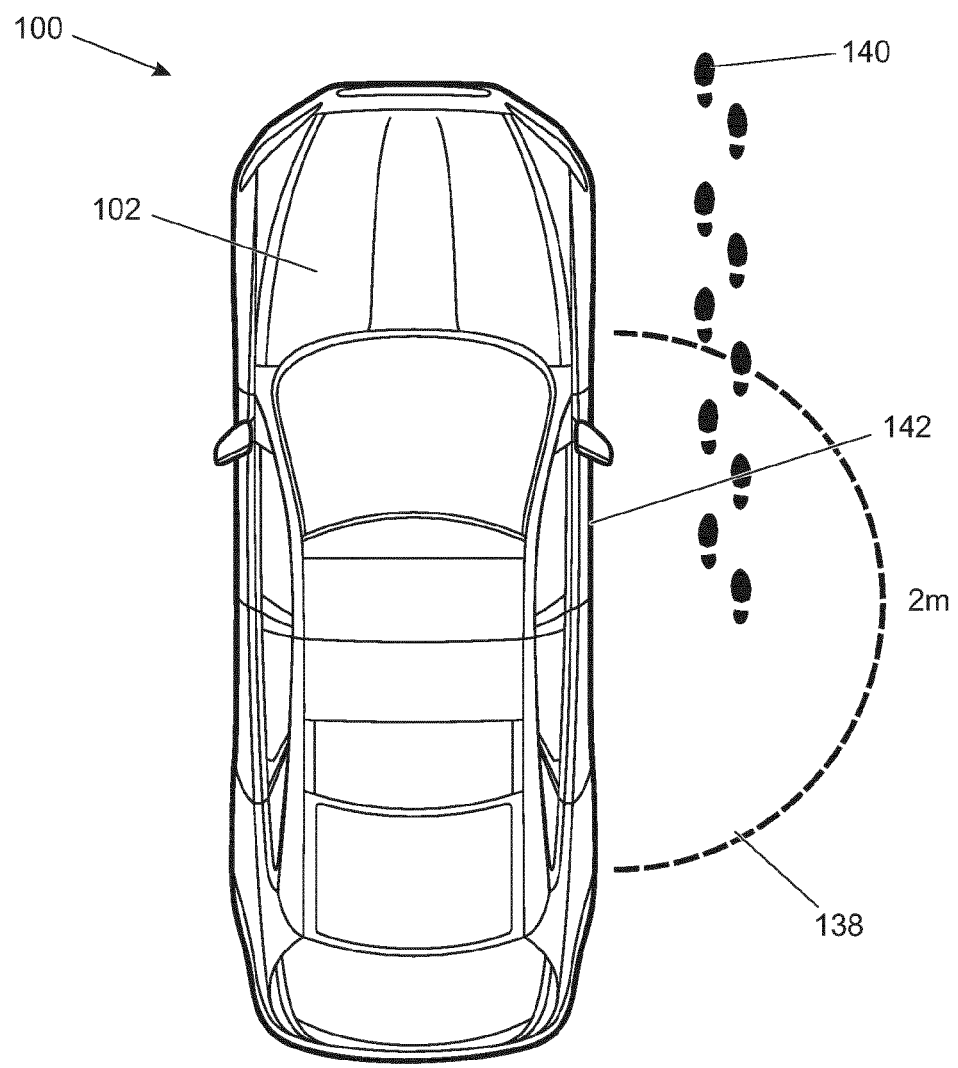
FIG. 5 illustrates another operating mode of the vehicle communication system according to one embodiment of the present invention.

The electronic control unit 106 may be configured to operate the vehicle communication system 100 according to a third operating mode as illustrated in FIG. 5 to facilitate the automatic locking of the doors 142-148 when the user walks away from the vehicle 102. In this scenario, the user exits the vehicle 102 carrying the mobile communication unit 122 and closes the vehicle doors 142-148. In the illustrated example, the user exits the vehicle 102 through the front right door 142 and then closes it. The user then walks away from the vehicle 102 carrying the mobile communication unit 122. As the mobile communication unit 122 is carried away from the vehicle 102, the vehicle communication system 100 tracks the location of the mobile communication unit 122 and compares that location to the definition of the authorization zone 138. If and when the vehicle communication system 100 determines that the mobile communication unit 122 has left the authorization zone 138, the vehicle communication system 100 transmits a door lock signal to lock the doors 142-148. The vehicle 102 is thereby secured automatically without the user activating the mobile communication unit 122 or taking any action other than walking away from the vehicle 102. A security protocol to comply with industry standards, for example those specified by Thatcham®, would typically be undertaken for the automatic locking of the doors 142-148. Under normal operating conditions, the automatic locking of the vehicle 102 does not double-lock the vehicle 102. Rather, the vehicle 102 would only be double-locked if the user specifically selected this locking mode, for example via a control panel in the vehicle 102.

Figure 6:
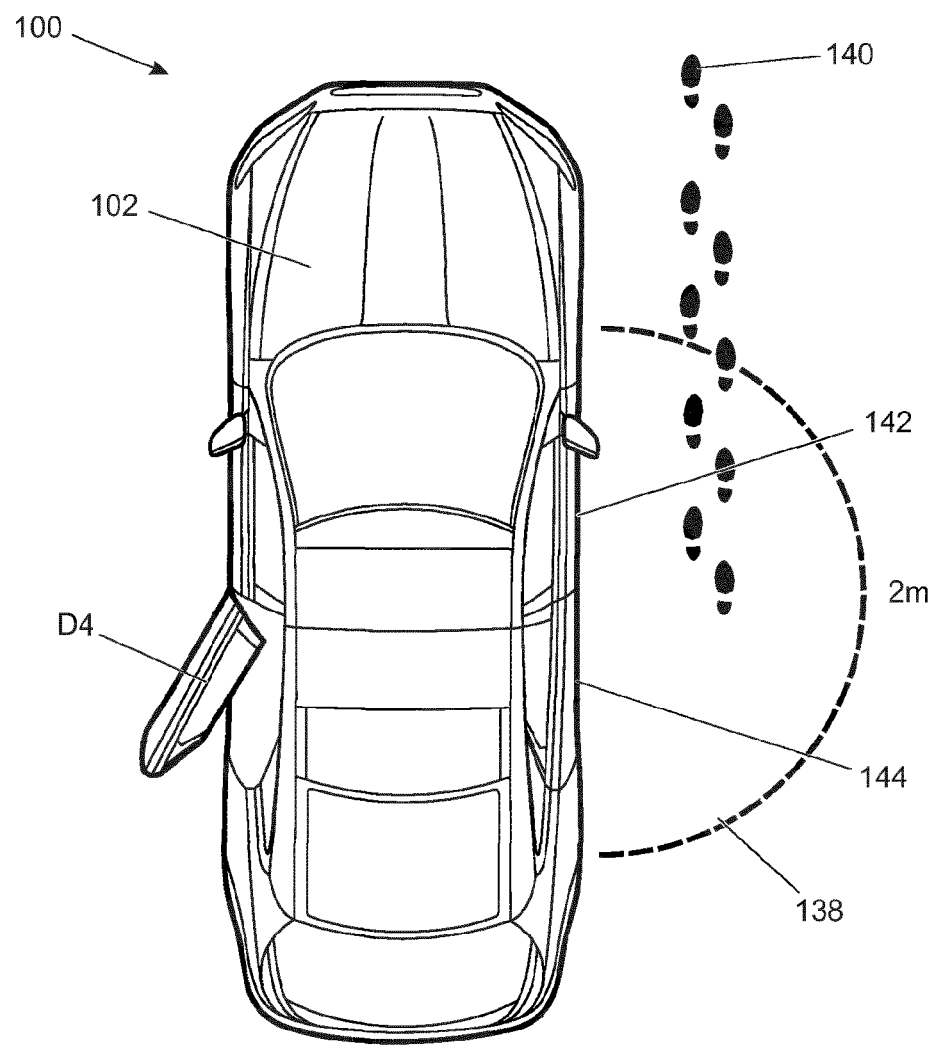
FIG. 6 illustrates another operating mode of the vehicle communication system according to one embodiment of the present invention.

The electronic control unit 106 may be further configured to operate the vehicle communication system 100 according to a fourth operating mode as illustrated in FIG. 6 to accommodate a mis-lock scenario. This mode is similar to the third operating mode described above insofar as the user exits the vehicle 102 through the front right door 142 and closes the door 142 before walking away from the vehicle 102. In connection with this fourth operating mode, the vehicle communication system 100 again determines if and when the mobile communication unit 122 has departed the authorization zone 138. As illustrated in FIG. 6, however, the rear left door 148 is ajar, and the electronic control unit 106 determines that the door 148 cannot be locked (a so-called mis-lock).

To avoid the user leaving the vehicle 102 in an unsecure state (as may otherwise occur if the operator had not noticed that the rear left door 148 was ajar) the electronic control unit 106 transmits an alert signal to the CAN bus 120 and a notification is provided to the user. For example, the CAN bus 120 may illuminate the side repeaters and/or provide an audible warning to notify the user that the doors 142-148 have not all been locked. When the rear left door 148 is closed, the vehicle communication system 100 will lock the door 148 to secure the vehicle 102.

In conjunction with the above-described modes of operation, the electronic control unit 106 may be configured to operate the vehicle communication system 100 according to a fifth operating mode, facilitating self-learning and adjustment of the authorization zone 138. In order to conserve energy stored in the second rechargeable battery 126 of the mobile communication unit 122, to avoid unintended and unnecessary actuation of vehicle systems, and to conserve energy in the components of the system, it may be desirable, in certain situations, for the dimensions of the authorization zone 138 to be adjusted. For example, in some modes, the mobile communication unit 122 is configured so as to periodically emit a pulse of information containing its identity, even while at a distance from the vehicle 102. When the vehicle 102 detects such pulses, the location and proximity of the mobile communication unit 122 may be determined. If the distance is within the authorization zone 138, the vehicle 102 commands the 122 to emit the pulses more frequently so as to provide increased resolution of its changing location. Unfortunately, these more frequent data transmissions tend to increase the rate at which energy stored in the internal battery of the mobile communication unit 122 is consumed.

In one embodiment, the authorization zone 138 is defined as a circle having a radius of approximately 1 meter to 2 meters around the vehicle 102. The mobile communication unit 122 can communicate with the vehicle 102 over a range that is on the order of tens of meters and up to perhaps over 100 m. Since the mobile communication unit 122 typically continues to transmit pulses periodically, whenever the mobile communication unit 122 enters the range of the vehicle 102, the vehicle 102 may detect and track the approach of the mobile communication unit 122. When the mobile communication unit 122 has approached the vehicle 102 to a location within the authorization zone 138, the base station 104 may undertake to unlock the doors. Unfortunately, when the vehicle 102 is parked in certain locations such as inside the garage of a user's home or in the user's driveway, certain incidental movements of the mobile communication unit 122 may occur in close proximity to the vehicle 102 though access to the vehicle 102 is not sought.

For example, the user may be mowing a lawn and therefore repeatedly following a path that enters and departs the authorization zone 138. Similarly, a user may walk across a room that is adjacent to the garage in which the vehicle 102 is parked while having no desire or need for the doors of the vehicle 102 to be unlocked. Nonetheless, if the mobile communication unit 122 is being carried by the user, unintended operation of vehicle 102 functions may occur without adjustments being made to the operation of the vehicle communication system 100. Accordingly, in various embodiments, the vehicle communication system 100 provides self-learning by the vehicle communication system 100 and facilitates adjustment of the authorization zone 138.

In one such embodiment, a vehicle communication system 100 for facilitating control over a function of a vehicle 102 comprises a base station 104 that is configured to determine a first location of the mobile communication unit 122 relative to the vehicle 102 at a first time and to determine a second location of the mobile communication unit 122 relative to the vehicle 102 at a second time. Both the first location and the second location may be stored in the memory for subsequent retrieval and processing. In addition, the base station 104 is configured to determine a baseline pattern of movement of the mobile communication unit 122 based at least in part on the first location and the second location and to determine whether a user-initiated interaction with the vehicle 102 occurs in connection with the baseline pattern of movement. For example, a user-initiated interaction with the vehicle 102 may include an attempt to open an aperture of the vehicle 102 such as a door or an attempt to start the vehicle 102 or to submit any request upon the vehicle 102 to perform a function.

The base station 104 is further configured such that, if no user-initiated interaction with the vehicle 102 occurs in connection with the baseline pattern of movement, the baseline pattern of movement is then classified as an incidental pattern of movement, whereupon, provided all other predefined conditions are satisfied, a zone adjustment may be applied to the authorization zone 138 so as to exclude the incidental pattern of movement. As a result, the base station 104 facilitates a process of self-learning by the vehicle 102 that may aid in avoiding unintended operation of vehicle functions or other unnecessary depletion of energy stored in batteries of the system.

As described elsewhere herein, the base station 104 may be configured to determine positions of the mobile communication unit 122 relative to the vehicle 102 based on a time of flight methodology. The base station 104 is also configured to recognize when a subsequent incidental pattern of movement is substantially similar to a previously observed incidental pattern of movement. More specifically, having saved the baseline pattern of movement in the memory, the base station 104 may determine a subsequent pattern of movement based on a later-acquired and saved plurality of position datum. The base station 104 may then determine whether a user-initiated interaction with the vehicle 102 occurs in connection with the subsequent pattern of movement, and if no user-initiated interaction with the vehicle 102 occurs in connection with the subsequent pattern of movement, the base station 104 may accordingly classify the subsequent pattern of movement as another incidental pattern of movement and may then compare the subsequent pattern of movement to other incidental patterns of movement stored in the memory.

If a quantity of incidental patterns of movement comprising two or more incidental patterns of movement that are stored in the memory are substantially similar to one another, then the base station 104 may define a common incidental pattern of movement having the movement characteristics of the two or more incidental patterns of movement and associate the quantity with the common incidental pattern of movement. Accordingly, the base station 104 may be configured to determine a number of occurrences wherein a subsequent incidental pattern of movement is observed to be substantially similar to a previously observed incidental pattern of movement. While it may not be desirable to apply an adjustment to the authorization zone 138 for every incidental pattern of movement, doing so may be desirable when the number of occurrences exceeds a predefined threshold number of occurrences. Similarly, the base station 104 may be configured to determine a rate at which subsequent incidental patterns of movement are observed to be substantially similar to a previously observed incidental pattern of movement and to apply a zone adjustment to the authorization zone 138 so as to exclude the incidental pattern of movement only when the rate at which subsequent incidental patterns of movement are observed exceeds a predefined threshold rate.

In another embodiment, the base station 104 is configured to determine a location of the vehicle 102 and to save the location, together with any associate adjustments made to the authorization zone 138, in the memory. The base station 104 is also configured to determine location of the vehicle 102, to retrieve a previously learned adjustment that is associated with the location from the memory, and to apply the retrieved adjustment to the authorization zone 138. For example, where the user repeatedly parks the vehicle 102 in a location, such as the garage at the user's home, and where the user undergoes typical incidental movement patterns adjacent to the vehicle 102 at that location, the base station 104 may learn to apply an adjustment to the authorization zone 138 as soon as the vehicle 102 arrives at the garage location. As a result, the base station 104 need not re-learn how to apply an adjustment to the authorization zone 138 each time the vehicle 102 moves. Rather, the adjustment may be applied as soon as the vehicle 102 arrives at the location.

In a further aspect of the invention, a method for facilitating control over a function of a vehicle 102 comprises providing a base station 104 positioned in the vehicle 102 and a mobile communication unit 122. The base station 104 comprises a first transmitter and a first receiver for communicating with the mobile communication unit 122. The method includes determining a first location of the mobile communication unit 122 relative to the vehicle 102 at a first time and determining a second location of the mobile communication unit 122 relative to the vehicle 102 at a second time. In addition, the method includes determining a baseline pattern of movement of the mobile communication unit 122 based at least in part on the first location and the second location and determining whether a user-initiated interaction with the vehicle 102 occurs in connection with the baseline pattern of movement. If no user-initiated interaction with the vehicle 102 occurs in connection with the baseline pattern of movement, the baseline pattern of movement is classified as an incidental pattern of movement and the base station 104 applies a zone adjustment to the authorization zone 138 so as to exclude to the incidental pattern of movement.

The step of determining a first position of the mobile communication unit 122 relative to the vehicle 102 at a first time may be performed according to a time of flight method. The method may further comprise recognizing when a subsequent incidental pattern of movement is substantially similar to a previously observed incidental pattern of movement and determining a number of occurrences wherein a subsequent incidental pattern of movement is observed to be substantially similar to a previously observed incidental pattern of movement. The step of applying a zone adjustment to the authorization zone 138 so as to exclude to the incidental pattern of movement may be performed only when the number of occurrences exceeds a predefined threshold number of occurrences. A rate may be determined at which subsequent incidental patterns of movement are observed to be substantially similar to a previously observed incidental pattern of movement and a zone adjustment may be applied to the authorization zone 138 so as to exclude to the incidental pattern of movement when the rate at which subsequent incidental patterns of movement are observed exceeds a predefined threshold rate. A location of the vehicle 102 may be determined and saved, together with the adjustment, in the memory. The method may include determining a location of the vehicle 102, retrieving a previously learned adjustment that is associated with the location from the memory, and applying the retrieved adjustment to the authorization zone 138.

The vehicle communication system 100 can optionally also provide keyless engine starting for the vehicle 102. By using the ranging data from the transceivers 110, 112, 114, the electronic control unit 106 can determine when the mobile communication unit 122 is inside the vehicle 102. A control signal can be transmitted to the engine control unit, via the CAN bus 120, to permit keyless engine starting when a Start button is pressed.

The vehicle communication system 100 according to the present invention can be further refined. In particular, the electronic control unit 106 can be configured to transmit a status signal to the mobile communication unit 122. For example, if the base station 104 detects a mis-lock scenario, the status signal may instruct the mobile communication unit 122 to generate a first user alert. Equally, the status signal may instruct the mobile communication unit 122 to generate a second user alert (which is different from the first user alert) when the vehicle 102 has been locked. The first and/or the second user alert could be provided instead of, or in addition to, any notification provided by the vehicle 102. The mobile communication unit 122 could comprise an audio, optical or haptic output for indicating the vehicle status. For example, the mobile communication unit 122 could comprise one or more of the following: LED(s), a text screen or a vibrating mechanism.

The mobile communication unit 122 is also provided with one or more buttons to allow a user to trigger locking/unlocking of the vehicle doors from outside of the authorization zone 138.

The ultra-wideband (UWB) transceivers 110, 112, 114, 124 described herein are compliant with IEEE802.15.4a protocol.

The vehicle communication system 100 can monitor time of flight (ToF) communications between the base station 104 and the mobile communication unit 122 to provide improved security, for example to protect against a relay-station security attack.

A door unlock override switch can be provided to unlock the doors 142-148 in the event of an emergency.

The skilled person will understand that various changes and modifications can be made to the vehicle communication system 100 described herein without departing from the spirit and scope of the present invention. For example, a welcome lights function could be supported by illuminating an interior and/or exterior vehicle light when the mobile communication unit 122 enters the authorization zone 138.

Although the vehicle communication system 100 has been described with reference to the mobile communication unit 122 transmitting the polling signal, the system could also operate if the base station 104 transmitted the polling signal. For example, the first transceiver 110 of the base station 104 may transmit a polling signal which, when received by the remote transceiver 124, initiates communication between the mobile communication unit 122 and the base station 104. In one embodiment, upon receipt of the polling signal, the mobile communication unit responds by transmitting a response signal. The response signal is received by the first transceiver 110 and the electronic control unit 106 validates the response signal.

The mobile communication unit 122 includes a motion sensor 152, such as a gyroscope or an accelerometer, to detect movements of the mobile communication unit 122. Signals based on the detected movements may then be transmitted to the base station 104 for use in deciding whether, when and how to facilitate control over functions of the vehicle 102. For example, if the base station 104 determines that the mobile communication unit 122 has been stationary for a predetermined period of time, the base station 104 may cause the mobile communication unit 122 to be disabled or to enter a sleep mode. In addition, the base station 104 could transmit a disable signal to deactivate the transceivers 110, 112, 114, 124. Alternatively, the transceivers 110, 112, 114, 124 could be disabled automatically if they do not receive an authorization signal for a predetermined period of time. The mobile communication unit 122 could be awakened by an activation signal from the motion sensor 152 when it detects movement.

Moreover, it will be appreciated that it is not necessary for a vehicle communication system 100 according to the present invention to provide all of the operating modes described herein. Rather, one or more of the operating modes could be embodied in a communication system in accordance with the present invention.

It will be appreciated that various changes and modifications can be made to the present invention without departing from the present invention. Further aspects of the present invention will be described with reference to the following numbered paragraphs.

1. A communication system for facilitating control over a function of a vehicle (102), the communication system comprising:
   a base station (104) positioned in the vehicle (102); and
   a mobile communication unit (122);
   the base station (104) comprising a first transmitter for transmitting a signal to the mobile communication unit (122) and a first receiver for receiving a signal from the mobile communication unit (122);
   the base station (104) configured to:
      determine a first location of the mobile communication unit (122) relative to the vehicle (102) at a first time;
      determine a second location of the mobile communication unit (122) relative to the vehicle (102) at a second time;
      determine a baseline pattern of movement of the mobile communication unit (122) based at least in part on the first location and the second location;
      determine whether a user-initiated interaction with the vehicle (102) occurs in connection with the baseline pattern of movement; and
      if no user-initiated interaction with the vehicle (102) occurs in connection with the baseline pattern of movement, then classify the baseline pattern of movement as an incidental pattern of movement and apply a zone adjustment to an authorization zone (138) so as to exclude the incidental pattern of movement.

2. A communication system as described in paragraph 1, wherein the base station (104) is configured to determine at least one of the first location and the second location of the mobile communication unit (122) relative to the vehicle (102) based on a time of flight method.

3. A communication system as described in paragraph 1, wherein the base station (104) is configured to recognize when a subsequent incidental pattern of movement is substantially similar to a previously observed incidental pattern of movement.

4. A communication system as described in paragraph 3, wherein the base station (104) is configured to determine a number of occurrences wherein a subsequent incidental pattern of movement is observed to be substantially similar to a previously observed incidental pattern of movement.

5. A communication system as described in paragraph 4, wherein the base station (104) is configured to apply a zone adjustment to the authorization zone (138) so as to exclude to the incidental pattern of movement only when the number of occurrences exceeds a predefined threshold number of occurrences.

6. A communication system as described in paragraph 3, wherein the base station (104) is configured to determine a rate at which subsequent incidental patterns of movement are observed to be substantially similar to a previously observed incidental pattern of movement.

7. A communication system as described in paragraph 6, wherein the base station (104) is configured to apply a zone adjustment to the authorization zone (138) so as to exclude to the incidental pattern of movement only when the rate at which subsequent incidental patterns of movement are observed exceeds a predefined threshold rate.

8. A communication system as described in paragraph 1, wherein the base station (104) is configured to determine a location of the vehicle (102) and save the location together with the zone adjustment in a memory.

9. A communication system as described in paragraph 8, wherein the base station (104) is configured to subsequently determine a later-determined location of the vehicle (102), to retrieve a zone adjustment from the memory associated with the later-determined location of the vehicle (102), and to apply the zone adjustment to the authorization zone (138).

10. A method for facilitating control over a function of a vehicle (102) comprising:
    providing a base station (104) positioned in the vehicle (102) and a mobile communication unit (122), the base station (104) comprising a first transmitter for transmitting a signal to the mobile communication unit (122) and a first receiver for receiving a signal from the mobile communication unit (122);
    determining a first location of the mobile communication unit (122) relative to the vehicle (102) at a first time;
    determining a second location of the mobile communication unit (122) relative to the vehicle (102) at a second time;
    determining a baseline pattern of movement of the mobile communication unit (122) based at least in part on the first location and the second location;
    determining whether a user-initiated interaction with the vehicle (102) occurs in connection with the baseline pattern of movement; and
    if no user-initiated interaction with the vehicle (102) occurs in connection with the baseline pattern of movement, classifying the baseline pattern of movement as an incidental pattern of movement and applying a zone adjustment to an authorization zone (138) so as to exclude the incidental pattern of movement.

11. A method for facilitating control over a function of a vehicle (102) as described in paragraph 10, wherein at least one of determining the first location and the second location of the mobile communication unit (122) relative to the vehicle (102) is performed according to a time of flight method.

12. A method for facilitating control over a function of a vehicle (102) as described in paragraph 10, further comprising recognizing when a subsequent incidental pattern of movement is substantially similar to a previously observed incidental pattern of movement.

13. A method for facilitating control over a function of a vehicle (102) as described in paragraph 12, further comprising determining a number of occurrences wherein a subsequent incidental pattern of movement is observed to be substantially similar to a previously observed incidental pattern of movement.

14. A method for facilitating control over a function of a vehicle (102) as described in paragraph 13, wherein said applying a zone adjustment to the authorization zone (138) so as to exclude to the incidental pattern of movement is performed only when the number of occurrences exceeds a predefined threshold number of occurrences.

15. A method for facilitating control over a function of a vehicle (102) as described in paragraph 12, further comprising determining a rate at which subsequent incidental patterns of movement are observed to be substantially similar to a previously observed incidental pattern of movement.

16. A method for facilitating control over a function of a vehicle (102) as described in paragraph 15, wherein said applying a zone adjustment to the authorization zone (138) so as to exclude to the incidental pattern of movement is performed only when the rate at which subsequent incidental patterns of movement are observed exceeds a predefined threshold rate.

17. A method for facilitating control over a function of a vehicle (102) as described in paragraph 10, further comprising determining a location of the vehicle (102) and saving the location together with the zone adjustment in a memory.

18. A method for facilitating control over a function of a vehicle (102) as described in paragraph 17, further comprising subsequently determining a later-determined location of the vehicle (102), retrieving the zone adjustment from the memory associated with the later-determined location of the vehicle (102), and applying the zone adjustment to the authorization zone (138).

19. A communication system as described in paragraph 2 wherein the base station (104) is configured for determining a location of the mobile communication unit (122) relative to the vehicle (102) based on a time of flight of an ultra-wide band communications between the mobile communication unit (122) and at least one transceiver positioned in the vehicle (102).

20. A vehicle (102) having a communication system, or being adapted to perform a method as described in paragraph 1 or 10.

The invention claimed is:

1. A communication system for facilitating control over a function of a vehicle, the communication system comprising:
    a base station positioned in the vehicle; and
    a mobile communication unit; and
    the base station comprising a first transmitter for transmitting a signal to the mobile communication unit and a first receiver for receiving a signal from the mobile communication unit, wherein the base station is configured to:
        determine a first location of the mobile communication unit relative to the vehicle at a first time;
        determine a second location of the mobile communication unit relative to the vehicle at a second time;
        determine a baseline pattern of movement of the mobile communication unit based at least in part on the first location and the second location;
        determine whether a user-initiated interaction with the vehicle occurs in connection with the baseline pattern of movement; and
        if no user-initiated interaction with the vehicle occurs in connection with the baseline pattern of movement, then classify the baseline pattern of movement as an incidental pattern of movement and apply a zone adjustment to an authorization zone so as to exclude the incidental pattern of movement.

2. The communication system of claim 1, wherein the base station is configured to determine at least one of the first location and the second location of the mobile communication unit relative to the vehicle based on a time of flight method.

3. The communication system of claim 1, wherein the base station is configured to recognize when a subsequent incidental pattern of movement is substantially similar to a prior incidental pattern of movement.

4. The communication system of claim 3, wherein the base station is configured to determine a number of occurrences wherein the subsequent incidental pattern of movement is substantially similar to the prior incidental pattern of movement, and wherein the base station is configured to apply the zone adjustment to the authorization zone so as to exclude the incidental pattern of movement only when the number of occurrences exceeds a predefined threshold number of occurrences.

5. A vehicle comprising the communication system of claim 1.

6. The communication system of claim 1, wherein the base station is configured to determine a rate at which subsequent incidental patterns of movement are substantially similar to a prior incidental pattern of movement, and wherein the base station is configured to apply the zone adjustment to the authorization zone so as to exclude the incidental pattern of movement only when the rate at which subsequent incidental patterns of movement exceeds a predefined threshold rate.

7. The communication system of claim 1, wherein the user-initiated interaction comprises at least one of: actuation of a door handle, an attempt to open an aperture of the vehicle, an attempt to start the vehicle, or an attempt to submit a request upon the vehicle to perform a function.

8. The communication system of claim 1, wherein the base station is configured to determine a location of the vehicle and save the location together with the zone adjustment in a memory.

9. The communication system of claim 8, wherein the base station is configured to subsequently determine a later-determined location of the vehicle, to retrieve a zone adjustment from the memory associated with the later-determined location of the vehicle, and to apply the zone adjustment associated with the later-determined location of the vehicle to the authorization zone.

10. The communication system of claim 1, wherein the base station is configured to apply the zone adjustment to an authorization zone by adjusting dimensions of the authorization zone.

11. The communication system according to claim 10, where adjusting the dimensions of the authorization zone comprises adjusting at least one of: a radius of the authorization zone, a shape of an outer boundary of the authorization zone, and a size of the authorization zone.

12. The communication system of claim 1, wherein the base station is configured for determining a location of the mobile communication unit relative to the vehicle based on a time of flight of an ultra-wide band communications between the mobile communication unit and at least one transceiver positioned in the vehicle.

13. A method for facilitating control over a function of a vehicle comprising:
    providing a base station positioned in the vehicle and a mobile communication unit, the base station comprising a first transmitter for transmitting a signal to the mobile communication unit and a first receiver for receiving a signal from the mobile communication unit;
    determining a first location of the mobile communication unit relative to the vehicle at a first time;
    determining a second location of the mobile communication unit relative to the vehicle at a second time;

determining a baseline pattern of movement of the mobile communication unit based at least in part on the first location and the second location;

determining whether a user-initiated interaction with the vehicle occurs in connection with the baseline pattern of movement; and if no user-initiated interaction with the vehicle occurs in connection with the baseline pattern of movement, classifying the baseline pattern of movement as an incidental pattern of movement and applying a zone adjustment to an authorization zone so as to exclude the incidental pattern of movement.

14. The method of claim 13, wherein at least one of determining the first location and the second location of the mobile communication unit relative to the vehicle is performed according to a time of flight method.

15. The method of claim 13, further comprising recognizing when a subsequent incidental pattern of movement is substantially similar to a prior incidental pattern of movement.

16. The method of claim 15, further comprising determining a number of occurrences wherein the subsequent incidental pattern of movement is substantially similar to the prior incidental pattern of movement, and wherein applying the zone adjustment to the authorization zone so as to exclude the incidental pattern of movement is performed only when the number of occurrences exceeds a predefined threshold number of occurrences.

17. A vehicle configured to perform the method of claim 13.

18. The method of claim 15, further comprising determining a rate at which subsequent incidental patterns of movement are substantially similar to the prior incidental pattern of movement, and applying the zone adjustment to the authorization zone so as to exclude the incidental pattern of movement only when the rate at which subsequent incidental patterns of movement exceeds a predefined threshold rate.

19. The method of claim 13, wherein applying the zone adjustment to the authorization zone comprises adjusting dimensions of the authorization zone, and wherein adjusting the dimensions of the authorization zone comprises adjusting at least one of: a radius of the authorization zone, a shape of an outer boundary of the authorization zone; and a size of the authorization zone.

20. The method of claim 13, further comprising determining a location of the vehicle and saving the location together with the zone adjustment in a memory, and subsequently determining a later-determined location of the vehicle, retrieving the zone adjustment from the memory associated with the later-determined location of the vehicle, and applying the zone adjustment to the authorization zone.

* * * * *